United States Patent
James et al.

(10) Patent No.: US 7,283,565 B1
(45) Date of Patent: Oct. 16, 2007

(54) METHOD AND APPARATUS FOR FRAMING A DATA PACKET

(75) Inventors: David V. James, Palo Alto, CA (US); Jagadeesan Rajamanickam, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1077 days.

(21) Appl. No.: 10/264,684

(22) Filed: Oct. 4, 2002

Related U.S. Application Data

(60) Provisional application No. 60/343,973, filed on Dec. 27, 2001.

(51) Int. Cl.
*H04J 3/00* (2006.01)
*H04J 3/16* (2006.01)
*H04J 3/22* (2006.01)

(52) U.S. Cl. .................. 370/476; 370/470; 370/472

(58) Field of Classification Search .................. None
See application file for complete search history.

(56) References Cited

U.S. PATENT DOCUMENTS

| | | | |
|---|---|---|---|
| 5,461,618 A * | 10/1995 | Chen et al. | 370/470 |
| 5,930,359 A * | 7/1999 | Kempke et al. | 713/160 |
| 6,049,539 A | 4/2000 | Lee et al. | |
| 6,956,852 B1 * | 10/2005 | Bechtolsheim et al. | 370/389 |

OTHER PUBLICATIONS

"IEEE Standard for Scalable Coherent Interface (SCI)", *IEEE Std 1596-1992*, Institute of Electrical and Electronic Engineers, Inc., New York, NY, pp. 4-25 and 47-72, May 23, 2001.

* cited by examiner

*Primary Examiner*—Chi Pham
*Assistant Examiner*—Ronald Abelson
(74) *Attorney, Agent, or Firm*—Haverstock & Owens LLP

(57) ABSTRACT

According to a data packet framing method of one embodiment, a data packet (100) may include a combination control character (102) that may convey framing information FLAG (102-0) and a code information CODE (102-1). Framing information FLAG (102-0) can indicate a start of a packet, and a code information CODE (102-1) can indicate another feature of a packet, such as size. A combination control character (102) may preferably be no larger than a data character of a data packet.

15 Claims, 8 Drawing Sheets

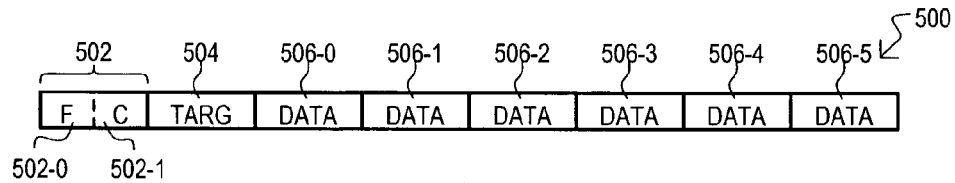
FIG. 5A
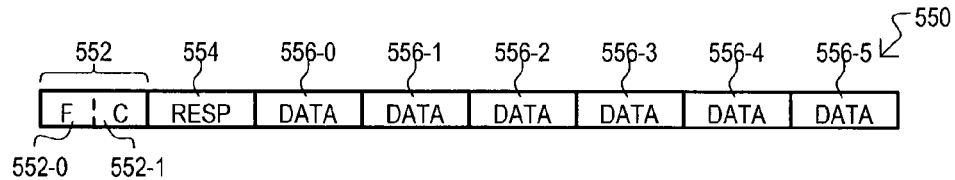
FIG. 5B
| CODE | WORDS | DESCRIPTION |
|------|-------|-------------|
| 0 | 0 | STANDARD "HEADER" ONLY |
| 1 | | VARIATIONS OF HEADER ONLY PAYLOAD |
| 2 | | |
| 3 | | |
| 4 | 1 | VARIATIONS OF ONE-WORD ONLY PAYLOAD |
| 5 | | |
| 6 | | |
| 7 | | |
| 8 | 2 | TWO WORD PAYLOAD |
| 9 | 3 | THREE WORD PAYLOAD |
| A | 4 | FOUR WORD PAYLOAD |
| B | 5 | FIVE WORD PAYLOAD |
| C | 6 | SIX WORD PAYLOAD |
| D | 7 | SEVEN WORD PAYLOAD |
| E | 8 | EIGHT WORD PAYLOAD |
| F | 9 | NINE WORD PAYLOAD |
FIG. 6
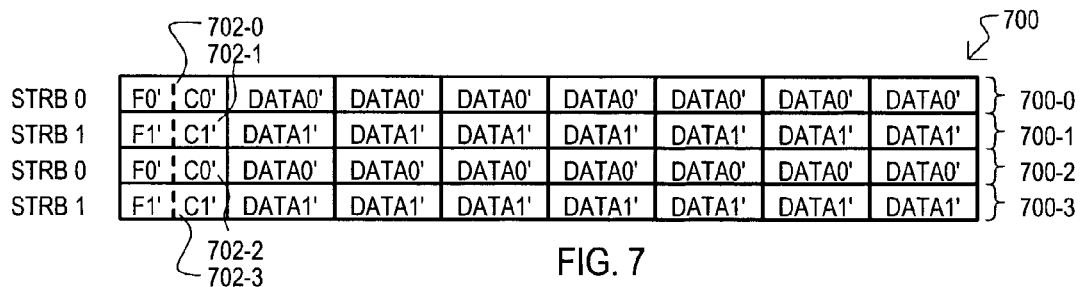
FIG. 7

METHOD AND APPARATUS FOR FRAMING A DATA PACKET

This application claims the benefit of provisional application Ser. No. 60/343,973 filed Dec. 27, 2001.

TECHNICAL FIELD

The present invention relates generally to systems that send and receive data packets, and more particularly, to data packet framing.

BACKGROUND OF THE INVENTION

Data transmission approaches may include those that include lines that always transmit certain values, and those that can transmit data in "packet" form. A data packet may include a number of data values that can include a series of characters (e.g., byte values, or the like). Such data characters may be transmitted "as is" or may be encoded.

Conventionally, a data packet may have a start and/or an end that can be indicated by one or more control characters. Thus, a data packet may be "framed" to indicate a start and/or an end of packet, to thereby separate one data packet from another. Conventional approaches may demarcate packets by inserting one or more "control" characters. Control characters can be data characters having values predetermined to provide control information, and not a particular data value.

Conventional data packet-framing schemes may take various forms. Examples of conventional data packet framing schemes will be now described in more detail with reference to FIGS. 14-17.

Referring now to FIG. 14, a first example of a conventional data packet framing is set forth and designated by the general reference character 1400. The example of FIG. 14 shows two data packets 1402 and 1404. A first data packet 1402 may be preceded by a control character CTRL 1406-0 and include a number of data characters (1408-0 to 1408-n). In a similar fashion, a second data packet 1404 may be preceded by a control character CTRL 1406-1, and include a number of data characters (a first of which is shown 1410-0).

Also shown in FIG. 14 are control characters 1406-2. Control characters 1406-2 show how control characters may serve as a separation mechanism between an end of a previous data packet 1402 and a start of a following data packet 1404.

Thus, FIG. 14 shows a conventional data packet framing scheme 1400 in which a start of a packet (e.g., 1402) may be indicated by a control code (e.g., 1406-0) followed by a data character (e.g., 1408-0), and an end of a packet may be indicated by a control code (e.g., 1402-2) following a final data character (e.g., 1408-n) of a packet (e.g., 1402).

In the approach of FIG. 14, data packets must be separated by at least one control code. Accordingly, "back-to-back" packet transmission, that is transmission of one packet immediately followed by another, may not be possible, as a control code may have to be inserted between such packets.

FIG. 14 shows an example of "unaligned" packet transmission. However, in some cases it may be desirable to transmit packet data in an aligned fashion. Such an approach is shown in FIG. 15.

Referring now to FIG. 15, a second example of a conventional packet framing is set forth and designated by the general reference number 1500. The example of FIG. 15 shows two packets 1502 and 1504 that may be transmitted in an "aligned" fashion. In particular, data may be conceptualized as being arranged into predetermined, uniform portions. In the particular case of FIG. 15, packet data may be arranged with a four byte alignment. Thus, unlike a first example of a conventional packet framing 1400, a second example of a packet framing 1500 may show a four data characters alignment.

As but one example, an arrangement such as that shown in FIG. 15 may transmit four characters (or codes) in parallel. Such character (or codes) may be encoded for transmission.

Like the approach of FIG. 14, in FIG. 15 a packet start and end may be delineated by a predetermined control code. However, due to the indicated character alignment, packet separation may be achieved by inserting control codes according to data alignment. Accordingly, a data packet 1502 may be preceded by four aligned control characters CTRL (collectively shown as 1506). Similarly, separation between data packet 1502 and subsequent data packet 1504 may be accomplished by inserting at least four aligned control characters CTRL (collectively shown as 1508).

In this way, according to FIG. 15, a packet transmitted according to "m" aligned characters, may be separated by j*m control codes, where j is at least one.

A drawback to a conventional packet framing like that of FIG. 15 can be that in order to align a data packet with more than one data characters, a same number of control characters is included to separate data packets. This can consume transmission bandwidth that might otherwise be used to transmit data.

Referring now FIG. 16, a third example of a conventional packet framing is set forth and designated by the general reference number 1600. The example of FIG. 16 shows two data packets (1602 and 1604). Unlike the examples of FIGS. 14 and 15, data packets (1602 and 1604) may include a start control character STRT in addition to a number of data characters. Thus, a data packet 1602 may begin with a start character STRT 1606-0 and be followed by a number of aligned data characters (one of which is shown as 1608), while data packet 1604 may include a start control character STRT 1606-1 and be followed by a number of aligned data characters (one of which is shown as 1610).

A receiving circuit may be capable of recognizing a start control character STRT, thus determining a start of a data packet.

The particular example of FIG. 16 also shows how control characters CTRL (collectively shown as 1612) may be transmitted when packets are not transmitted (i.e., during idle time periods). Such control characters may be the same "idle" value.

Referring now to FIG. 17, a fourth conventional example of packet framing is set forth and designated by the general reference 1700. The example of FIG. 17 shows two data packets 1702 and 1704. In the approach of FIG. 17, each data packet may begin with a size control character SIZE. Thus, a data packet 1702 may begin with a size control character SIZE 1706-0 and be followed by a number of aligned data characters DATA (one of which is shown as 1708). Similarly, a data packet 1704 may include a size control character SIZE 1706-1 and be followed by a number of aligned data characters DATA (one of which is shown as 1710).

A size control character SIZE (1706-0 or 1706-1) may indicate a size of a data packet. Accordingly, a receiving circuit may determine when a packet starts or when a packet ends from such a size control character SIZE (1706-0 or 1706-1).

A drawback to the conventional approach shown in FIG. 17 can be complexity that can arise in the event of data corruption. In particular, a receiving circuit may rely on a size control character to synchronize a start of a next packet. However, if size data for one packet is corrupted, a start of a subsequent packet may be missed, and a system may have to "re-synchronize" communication to re-establish a start location for transmitted packets.

While the above examples have illustrated various approaches to transmitting packet data, it remains a desirable goal to arrive at further ways of increasing the efficiency in the manner in which packet data is transmitted, as more efficient methods may lead to improved overall data packet transmission rates.

SUMMARY OF THE INVENTION

According to the present invention a method of framing data packets may include starting a packet with a combination control code of N bits. Such a combination control code may provide first packet information that indicates a start of the packet and provides second packet format information.

According to one aspect of the embodiments, the data packet may include at least one data character of N bits.

According to another aspect of the embodiments, N is no more than ten.

According to another aspect of the embodiments, the packet can be a request packet that includes a request for the execution of a predetermined operation. In addition, at least one data character can include a request priority value that can restrict the operation to portions of a semiconductor device according to internal priority values for such portions.

According to another aspect of the embodiments, second packet information can include a size value that indicates a size of a packet.

According to another aspect of the embodiments, a method of framing data packets may also include providing a number of size values for same size packets.

According to another aspect of the embodiments, a method of framing data packets can also include distinguishing request packets from response packets. Request packets can include commands for execution by a memory device. Response packets can include result data from executed commands. Such a distinguishing may be accomplished by including a predetermined type data character in the packet. A type character can have the same number of bits as a combination control code.

According to another aspect of the embodiments, a method may include framing a response packet that includes a result of a predetermined operation. In addition, a data character can include a response priority value that establishes a priority for the result with respect to results of other response packets.

The present invention can also include a method having the steps of framing packets in a content addressable memory system. Such packets can be part of an encoded communication. A framing can include selecting one group of control codes and applying a selected control code to a start of a packet.

According to one aspect of the embodiments, a method may include selecting a control code according to a payload size.

According to another aspect of the embodiments, a method can include selecting from multiple control codes for a same payload size. According to another aspect of the embodiments, a method can also include framing packets according to a predetermined character alignment. In particular arrangements, a predetermined character alignment can be a $2^i$ character alignment, wherein i can be more than 1.

According to another aspect of the embodiments, a method can also include applying the selected control code as a first character of a packet that includes a plurality of characters.

According to another aspect of the embodiments, control codes can be transmitted as encoded control codes with a strobe signal. Such encoded control codes can have a first sequence of bit values when the strobe signal has one value and a different sequence of bit values when the strobe signal has another value.

The present invention may also include a memory device having a number of signal lines. A first set of signal lines can receive a combination control character that includes framing information that can indicate a start of a data packet and feature information that can indicate a feature of the data packet. A combination control character can have no more bits than other data characters of a data packet.

According to one aspect of the embodiments, a memory device can include a comparator that generates a start indication in response to at least one combination control character.

According to another aspect of the embodiments, a memory device can include a comparator that generates a feature value in response to at least one combination control character.

According to another aspect of the embodiments, a feature value may be a size value for a packet.

According to another aspect of the embodiments, a memory device can include a command decoder that receives command data from a packet. A memory device can also include a memory array that performs predetermined functions in response to command data. In particular arrangements, a memory array can include a content addressable memory array.

BRIEF DESCRIPTION OF THE DRAWINGS

FIGS. 5A and 5B is block diagram showing examples data packet framing according to another embodiment of the present invention.

FIG. 6 is a table showing examples of code portion values according to an embodiment.

FIG. 7 is a block diagram showing an example data packet framing according to another embodiment of the present invention.

DETAILED DESCRIPTION OF THE EMBODIMENTS

Various embodiments of the present invention will now be discussed in conjunction with a number of figures. The embodiments set forth data packet framing methods and devices.

Figure 1:
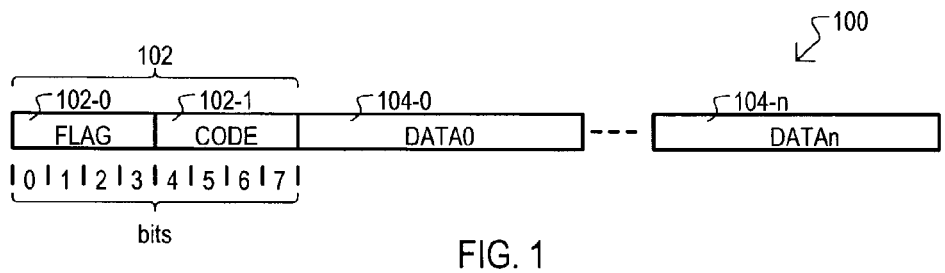
FIG. 1 is block diagram showing an example data packet framing according to a first embodiment of the present invention.

Referring now to FIG. 1, a data packet according to a first embodiment is set forth and designated by the general reference number 100. A data packet 100 may include a leading combination control character 102 and a number of trailing data characters DATA (104-0 to 104-*n*). A combination control character 102 may be considered a "leading" character, as a combination control character 102 may be a first character in a data packet. A control character 102 may be considered a "combination" character in that it may provide more than one type of control information in a single character.

A combination control character 102 can be conceptualized as including more than one type of packet information in the same control character. In the example of FIG. 1, a combination control character 102 may include framing information FLAG 102-0 and "code" information 102-1. Thus, a combination control character 102 can be decoded to yield at least two different types of information. Preferably, framing information 102-0 can signify a start indication for a data packet 100. Code information 102-1 may identify some other feature of a data packet 100

A combination control character 102 may thus provide a start indication by including one, or preferably more than one, combination of predetermined bit values recognizable by a receiving circuit as signifying a packet start.

Still further, unlike conventional approaches, more than just framing information may be included in a single character. Preferably, framing information and feature information may be present in no more than one byte.

In one very particular approach, code information CODE 102-1 can indicate a data packet payload size. A data packet payload size may reflect how much data may be included in a data packet. In one particular approach, each data packet may be understood to include a first group of characters (e.g., a word, double-word, etc.) of a predetermined size. A code portion CODE 102-1 can indicate how many (if any) groups of data characters may follow such a first group.

In this way, in addition to a start indication, a combination control character 102 may provide a size indication by including one, or preferably more than one, combination of predetermined bit values recognizable by a receiving circuit as signifying both a packet start and a packet size.

Unlike conventional approaches that may provide unique size characters to indicate each packet size, according to the present invention, code information CODE 102-1 of a combination control character 102 may indicate one of multiple values for a same payload size. More detailed examples of such a feature will be described below.

Thus, it is understood that a combination control character 102 may have more than one value. For example, multiple combination control characters 102 may represent a subset of all possible combination control characters in a system. Even more particularly, a system may include characters that can be numerical characters (e.g., represent a particular number) or control characters (e.g., provide control information for devices). In one approach, control characters may be distinguished from numerical by a decoding operation on a device. A given subset of such control characters can be combination control characters.

In one approach, control characters can be bit binary values and those in a given numerical range may be combination control characters. Even more particularly, control characters may be eight bit values, and those having a magnitude of less than "16" can be combination control codes, while those greater than 16 can be control characters for other purposes.

Having described a first example of a data packet according to one embodiment, a second example of a data packet framing will now be described.

Figure 2:
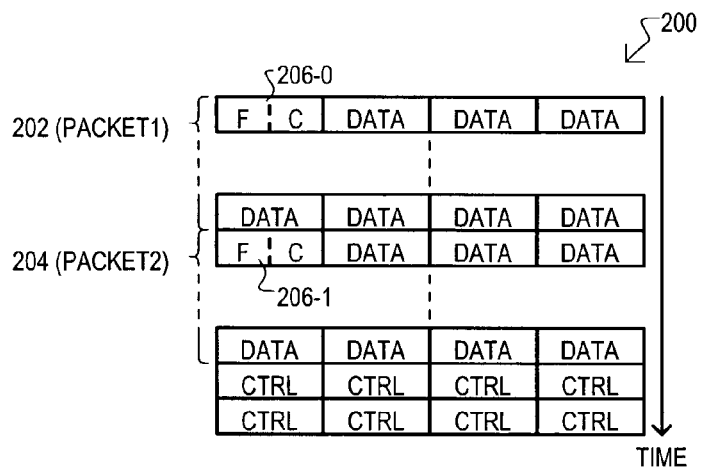
FIG. 2 is block diagram showing an example data packet framing according to a second embodiment of the present invention.

Referring now to FIG. 2, a second example of a data packet framing according to an embodiment is set forth and designated by the general reference number 200. The example of FIG. 2 shows two data packets 202 and 204. Each data packet may start with a combination control character. Thus, data packet 202 may begin with combination control character 206-0, while data packet 204 may begin with combination control character 206-1.

Unlike conventional data packet framing approaches, a combination control character (206-0 or 206-1) may provide multiple control information for a packet. Preferably, each a combination control character (206-0 or 206-1) may include framing information (represented by "F") and a code information (represented as "C"), as described above in conjunction with FIG. 1.

In the example of FIG. 2, a receiving device, or the like, may recognize a combination control character (206-0 or 206-1) as one or more particular patterns. In this way, a start of a packet may be determined. In addition, the same combination control character may include code information that may, with the same control character, indicate some feature for a packet, such as payload size, or the like. In a particular approach, code information C can provide an indication of how many additional aligned character sets may follow a first aligned character set. Thus, the example of FIG. 2, a code information C may indicate how many (if any) four aligned character sets may follow a first four character set that includes a combination control character (206-0 or 206-1).

A third example of a data packet will now be described in more detail with reference to in FIG. 3.

Figure 3:
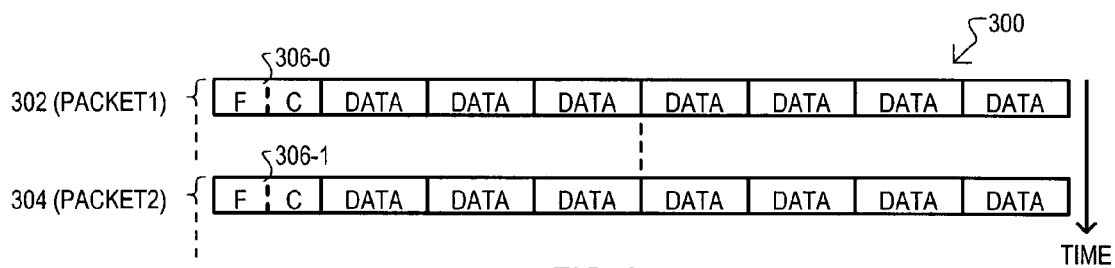
FIG. 3 is block diagram showing an example data packet framing according to a third embodiment of the present invention.

Referring now to FIG. 3, a third example of a data packet framing according to an embodiment is set forth and designated by the general reference number 300. FIG. 3 includes the same general items as FIG. 2. To that extent, like items are referred to by the same reference character but with a first digit being a "3" instead of a "2."

Thus, FIG. 3 shows two packets 302 and 304 that may each include a combination control character 306-0 and 306-1. In the example of FIG. 3, data packets (302 and 304) may have a larger character alignment than that of FIG. 2.

It is noted that a comparison between FIGS. 2 and 3 can illustrate how a combination control character (containing framing information) can provide a character alignment indication in addition to a start indication. In FIG. 2, a combination control character (containing framing information) may indicate four character (e.g., byte) alignment, while in FIG. 3 a combination control character (containing framing information) can indicate eight character (e.g., byte) alignment.

Figure 4:
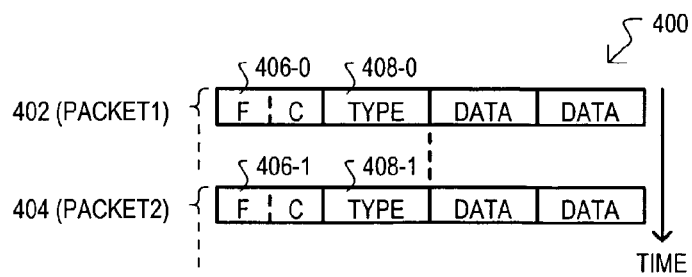
FIG. 4 is block diagram showing an example data packet framing according to another embodiment of the present invention.

Referring now to FIG. 4, a fourth example of a data packet framing according to an embodiment is set forth and designated by the general reference number 400. FIG. 4 shows portions of two data packets (402 and 404). Each data packet (402 and 404) may begin with a combination control character (406-0 or 406-1), like that described above.

Unlike the above embodiments, according to the embodiment of FIG. 4, a packet (402 or 404) may further include a type field TYPE. In FIG. 4, a data packet 402 may include a type field TYPE 408-0, while data packet 404 may includes a type field TYPE 408-1. A type field TYPE (408-0 or 408-1) may signify a different processing for a packet. As but one example, one type of data packet may indicate a type of operation to be performed by a receiving device, while another type of data packet may indicate a result of an operation performed by a device.

Preferably a type field may store a character value having no more bits than a combination control character. In this way, a start indication (optionally an alignment indication), a size indication, and type indication may be provided with only two characters.

In this way, a data packet framing 400 can include both a combination control character (406-0 or 406-1) as well as a type field (408-0 or 408-1).

An example of particular request and response packet formats will now be described with reference to FIGS. 5A and 5B.

Referring now to FIG. 5A, an example of a first portion of a request data packet according to one embodiment is set forth and designated by the general reference number 500. A request data packet 500 may include a combination control character 502, a device field 504, and a number of other data characters (506-0 to 506-5). A control character 502 may convey both framing information F 502-0 and a code information C 502-1, as noted above.

A device field 504 of FIG. 5A stores a target value TARG that can identify one or more devices for which a request packet is intended. Preferably, a target value TARG can identify an intended destination for a packet. Such a destination may include a device or particular locations within a device. Preferably, a target value can identify one or more locations in a memory device, even more preferably predetermined portions of a content addressable memory (CAM) device.

Data characters (506-0 to 506-5) may include additional control information for a packet, or may be data values that represent part of a packet payload.

Referring now to FIG. 5B, an example of a first portion of a response data packet according to one embodiment is set forth and designated by the general reference number 550. A response data packet portion 550 may have the same general format as a request data packet portion 500, including a combination control character 552, a target field 554, and a number of other data characters (556-0 to 556-5). A control character 552 may include a framing portion F 552-0 and a code portion C 552-1, like those noted above.

Unlike FIG. 5A, a target field 554 of FIG. 5B can store a response value RESP. A response value RESP can indicate that a packet carries response data generated by a device.

Data characters (556-0 to 556-5), like those in FIG. 5A, may include additional control information for a packet, or may be data values that represent part of a packet payload.

Thus, a receiving device may receive a data packet having either of the general formats shown in FIGS. 5A and 5B. Such a receiving device can determine a start of a packet by determining when a combination control character 502 matches one or more predetermined "start" patterns, thereby conveying framing information. A receiving device can also determine if a received packet is intended for the device by determining if data of a target field 504 matches one or more target values associated with the device, or if such data matches one or more predetermined response values. Such a determination can dictate how a received packet can be processed.

While code information conveyed by a combination control character may take various forms, particular examples of code information will now be described with reference to FIG. 6.

Referring now to FIG. 6, a table is set forth that shows particular examples of code information values. The table of FIG. 6 is designated by the general reference character 600, and may include a code column CODE, a word column WORDS, and a description column DESCRIPTION.

A code column CODE may indicate a particular code information value. In the example of FIG. 6, a code information values are represented in hexadecimal format. As but one very particular example, code information values can represent a magnitude of a control character. Even more particular, control characters in a system may be eight bit characters. The code values of FIG. 6 can represent those control characters that are combination control characters.

A word column WORDS may indicate how many predetermined groups of characters may follow a group of characters that includes a combination control character conveying code information CODE. That is, a word column WORDS value can be conceptualized as a "payload" size for a packet. It is understood that a "WORD" should not be construed as being limited to a particular format. A word value may preferably include N*M bits, where N is a number greater than zero, and M is a number of bits within a normal data character of a data packet. A WORD can indicate a number of eight bit bytes, preferably a two byte word, even more preferably a four byte "double" word.

A description column DESCRIPTION can include a brief description of what a code information value CODE can represent. Particular examples of data packets having code information values like that shown in FIG. 6 will now be described.

If reference is made back to FIG. 2, a first group of four parallel data characters can include a combination control code 206-0. Such a first group of four characters can be considered a "header" of a packet. If a code information C conveyed by a combination control code 206-0 has a value of "2", according to FIG. 6, such a first group of characters can form an entire packet 202, as a code information value CODE of "2" indicates that no additional data "words" (in this example four characters) follows such a header. In contrast, if a code information C within a combination control code 206-0 has a value of "A", according to FIG. 6, an initial four character header of packet 202 may be followed by 4 such additional groups, to form a packet that includes 20 characters total.

If reference is made back to FIG. 3, a first group of eight parallel characters can include a combination control code 306-0. Such a first group of eight characters can be considered a "header" of a packet. If a code information C conveyed by a control code 206-0 has a value of "A", according to FIG. 6, an initial eight character header of packet 202 may be followed by 4 such additional groups, to form a packet that includes 40 characters total.

In contrast to conventional size indication approaches, according to the present invention, there may be multiple code information values for a single payload size. This is shown in FIG. 6 by code information values CODE 0-3 that all indicate a "0" word payload. A code information value of 0 can represent a standard header only packet format, while code information values of 1-3 can represent variations of header only packets. Such an approach may allow for more rapid processing of packet data, as certain variations of same packet size may indicate a predetermined function (e.g., a common read operation, or write operation). Still further, such variations of same packet size may indicate sub-word data format (indicate that only a portion of "word" has valid data).

In this way, multiple different combination control characters may represent a same size payload. Further, different variations of combination control characters that represent a same size payload may additionally indicate one or more predetermined functions.

Referring now to FIG. 7, an example of packet transmission according to an embodiment is set forth and designated by the general reference number 700. FIG. 7 shows four encoded data packets (700-0 to 700-3), each of which may include an encoded combination control character (702-0 to 702-1). Each encoded combination control character (702-0 to 702-1) may be conceptualized as conveying flag information (F0' or F1') and code information (C0' or C1').

Each data packet (700-0 to 700-3) may also include a number of other encoded data characters, shown as DATA0' and DATA1'.

FIG. 7 illustrates a case in which characters of a packet may be encoded for transmission. More particularly, packet data may be transmitted according to an alternating strobe signal, with character values having one encoding in conjunction with one strobe value and another encoding in conjunction with another strobe value.

Thus, FIG. 7 shows four data packets (700-0 and 700-1), each transmitted as eight encoded characters in parallel. A data packet 700-0 may be transmitted with a strobe signal having a low value. A combination control character 702-0 may be encoded according to a first encoding method. Preferably, such a first encoding method generates an encoded control character can have a predetermined minimum DC component when a low strobe bit value is summed with encoded data bits.

Following a data packet 700-0, a data packet 700-1 may be transmitted. At this time a strobe signal can have a high value. A combination control character 702-1 may be encoded according to a second encoding method. Preferably, a second encoding method generates an encoded control character can have a predetermined minimum DC component when a high strobe bit value is summed with encoded data bits.

Subsequently, a data packet 700-2 may be transmitted when a strobe value is low, and following that, a data packet 700-3 may be transmitted when a strobe value is high.

It is noted that an encoding set forth in FIG. 7, may involve encoding characters of one bit size into encoded characters of a larger bit size. More particularly, characters may be encoded into larger bit size encoded characters that may provide better transmission characteristics. Even more particularly, characters of 8-bit size may be encoded into encoded characters of 10-bit size. Selected of the 10-bit encoded characters may have DC components with absolute value of no more than two. A DC component may be a sum of binary digit values with a "1" having a weight of 1 and a "0" having a weight of −1.

In this way, combination control characters may be differently encoded according to an accompanying strobe signal. In addition or alternatively, combination control characters may be encoded into encoded combination control characters having a greater number of bits.

Having described various examples of data packet framing, an example of a decoding circuit will now be described in FIG. 8.

Figure 8:
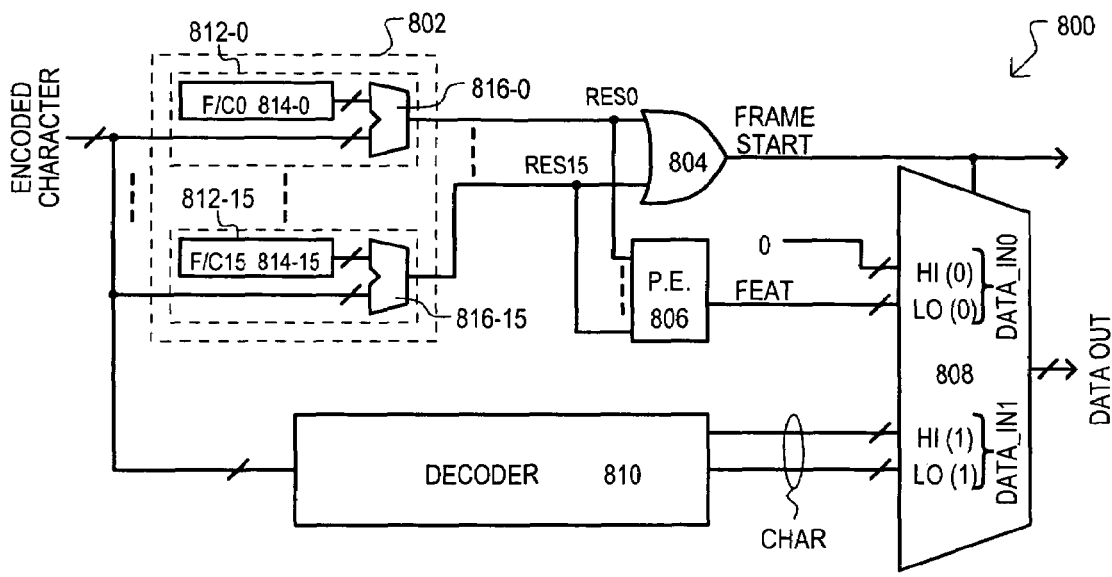
FIG. 8 is a block diagram of a decoding circuit according to one embodiment of the present invention.

Referring now to FIG. 8, an example of a decoding circuit according to one embodiment is set forth and designated by the general reference character 800. A decoding circuit 800 may include a combination control character detector 802, combining logic 804, a priority encoder 806, a data multiplexer (MUX) 808, and a decoder 810.

An encoded character ENCODED CHARACTER may be received by a combination control character detector 802 and a decoder 810. A combination control character detector 802 may provide detect results RES0 to RES15 to combining logic 804 and priority encoder 806. Combining logic 806 may provide a control signal FRAME START to data MUX 808. A priority encoder 806 may encode a highest priority result value into feature data FEAT. Feature data FEAT may be provided as lower order data (e.g., bits of lower significance) for a first input of data MUX 808. In the particular arrangement of FIG. 8, a value of zero may be provided as higher order data (e.g., bits of higher significance) for a first input of data MUX 808.

A decoder 810 may decode an encoded character into a decoded character. A decoded character CHAR may be provided as a second input of data MUX 808.

In FIG. 8, a combination control character detector 802 may include compare circuits 812-0 to 812-15. Each compare circuit (812-0 to 812-15) may compare a received encoded character to combination control character value (F/C0 to F/C15) and activate a corresponding result value (RES0 to RES15) if a match exists.

In one very particular approach, each compare circuit (812-0 to 812-15) may include a control character provider 814-0 to 814-15 and a comparator circuit 816-0 to 816-15. A comparator circuit (816-0 to 816-15) may receive a combination control character value (F/C0 to F/C15) at one input and an encoded character at another input, and provide a result value (RES0 to RES15) at an output.

The operation of the decoding circuit 800 will now be described. It will be assumed that two encoded characters are received, one after the other. It will be assumed that the first is a combination control character that matches combination control character value F/C15, and the second value is a data character that decodes into a hexadecimal value 4F.

A first encoded character may be received by a combination control character detector 802 and a decoder 810. Within combination control character detector 802, a received encoded character may be compared to multiple combination control character values (F/C0 to F/C15) in parallel. As noted above, in this example it is assumed that the first received encoded character matches combination control character value F/C15. As a result, compare circuit 812-15 may activate a result value RES15. It will be assumed that result values RES0-RES14 remain inactive.

An active result value RES15 may be received by combining logic 804, which may place control signal FRAME START at a value that selects a first data input DATA_IN0.

An active result value RES15 may also be encoded by priority encoder 806 into feature data. As but one very particular example, if reference is made back to FIG. 6, such feature data may include a size value indicating a payload size (e.g., nine words). Such a feature value may be provided as lower data bits to a first input DATA_IN0 of data MUX 808. Thus, in response to an encoded character that matches combination control character value F/C15, feature data FEAT may be provided as output data from data MUX 808 and an active control signal FRAME START may be generated.

A second encoded character may then be received by a combination control character detector 802 and a decoder 810.

Within combination control character detector 802, a received encoded character may not match any of the combination control character values (F/C0 to F/C15). Consequently, result values RES0-RES15 may be inactive.

Inactive result values RES0-RES15 may be received by combining logic 804, which may place control signal FRAME START at a value that selects a SECOND data input DATA_IN1.

A received second encoded character may be decoded within decoder 810 to generate a character 4F, as a data character. Thus, an encoded character that does not match a predetermined combination control character value F/C0-F/C15 may be decoded and provided as an output character from data MUX 808.

Of course, while the particular example of FIG. 8 shows the comparison of encoded characters to 16 possible combination control character values, comparisons with fewer or greater numbers of values would be obvious. Further, additional comparison operations can be possible.

Still further, it is understood that a compare operations may include an exact match and/or a range match, as but two examples.

Having described an example of a decoding circuit, an example of an encoding circuit will now be described in FIG. 9.

Figure 9:
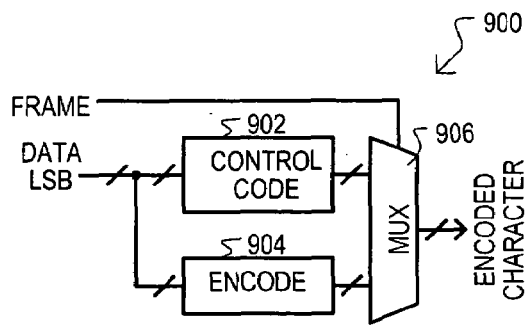
FIG. 9 is a block diagram of an example of an encoding circuit according to one embodiment of the present invention.

Referring now to FIG. 9, an encoding circuit according to one embodiment is set forth and designated by the general reference character 900. An encoding circuit 900 according to one embodiment may include a control code generating circuit 902, a data encoding circuit 904, and a multiplexer (MUX) 906. A control code generating circuit 902 may receive less significant bit values DATA LSB as an input, and provide control characters as an output. Similarly, an encoding circuit 904 may encode received less significant bit values DATA LSB into encoded character values.

A multiplexer 906 may select between a control character provided by control code generating circuit 902 and an encoded character generated by encoding circuit 904. More particularly, if a frame start indicator FRAME is active, indicating the start of a data frame, a control character from control code generating circuit 902 may be output from MUX 906. However, if a frame start indicator FRAME is inactive, indicating a trailing character of a frame, an encoded character from encoding circuit 904 may be output from MUX 906.

Figure 10:
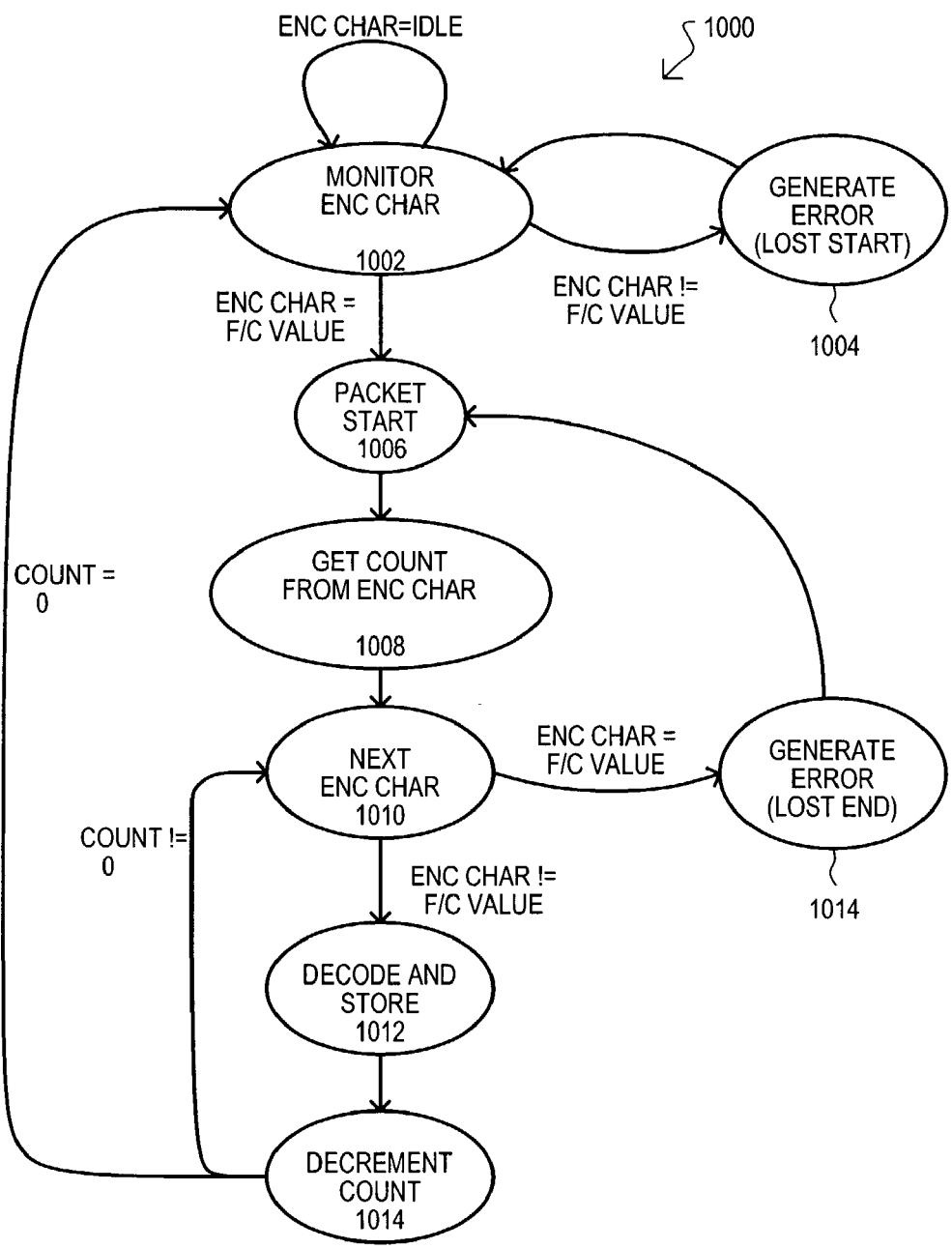
FIG. 10 is a state diagram of a receiving method and device according to an embodiment of the present invention.

Referring now to FIG. 10, a state diagram of a packet receiving method and device according to one embodiment is set forth and designated by the general reference character 1000. A packet receiving method/device 1000 may monitor received encoded character values 1002. Such a step may include receiving an encoded character and determining if such an encoded character matches one or more combination control character values (ENC CHAR=F/C VALUE) or does not match any combination control character values (ENC CHAR !=F/C VALUE). As noted above, a combination control character value may provide both a packet start indication in addition to other packet information (e.g., size).

A state 1002 may further include determining if a received data character is an idle character (ENC CHAR=IDLE). A reception of an idle character can indicate to a system that packet data is not being received, and that data lines are in an idle state.

As shown in FIG. 10, if a first portion of a received data character does not match a combination control character values (ENC CHAR !=F/C VALUE), an error indication can be generated 1004. In one approach, generating an error indication 1004 can indicate to a system that packet data is being received, but that a start for such a packet has not been determined.

If a received encoded character matches a combination control character value (ENC CHAR=F/C VALUE) a packet start state 1006 can be reached. A packet start state 1006 may indicate that a new packet is being received, and that a start for such a packet has been established by examining a leading combination control character of such a packet.

In the particular example of FIG. 10, upon establishing a start for a data packet from a combination control character, a count value for such a data packet can be determined from a same combination control character 1008. A next encoded character may be examined 1010. If a next received encoded character matches a combination control character value (ENC CHAR=F/C VALUE) an error indication can be generated 1014. In one approach, generating an error indication 1014 can indicate to a system that a packet that was being received was prematurely terminated due to the arrival of a subsequent packet. From state 1014, a method/device may transition to state 1006 to begin processing such a new packet.

If a next received encoded character does not match a combination control character value (ENC CHAR !=F/C VALUE), such an encoded character may be decoded and stored 1012. A count value may then be decremented 1014.

If a decremented count does not equal zero (COUNT !=0), more packet data is to be stored, and a method/apparatus 1000 may return to a state 1010. If, however, a decremented count equals zero (COUNT=0) a packet has been stored, and a method/apparatus 1000 may return to a state 1002.

In this way, a packet receiving method and device may establish size and start information for a data packet from a single data character, and store a data packet according to such information.

Figure 11:
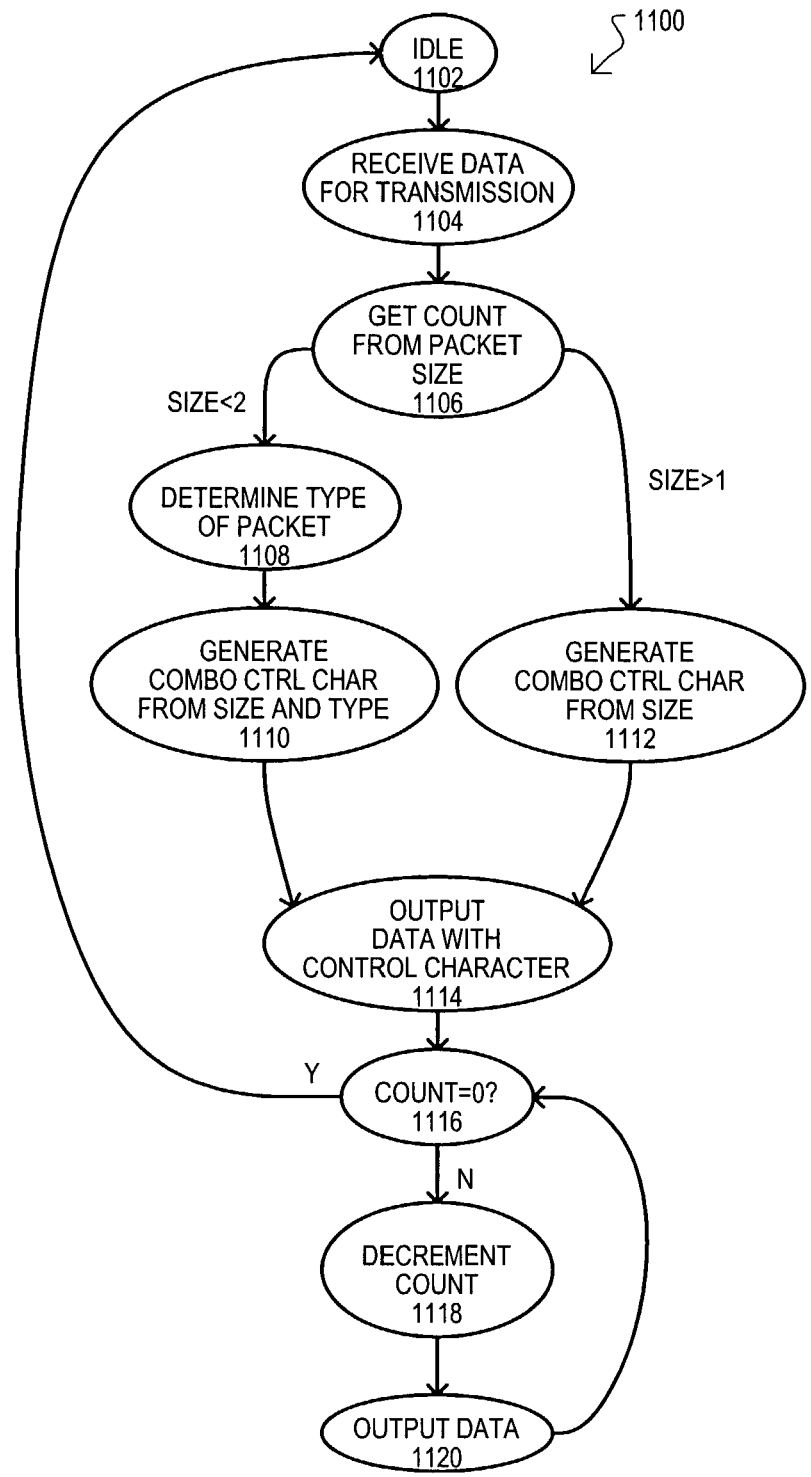
FIG. 11 is a state diagram of a sending method and device according to an embodiment of the present invention.

Referring now to FIG. 11, a state diagram of a packet sending method and device according to one embodiment is set forth and designated by the general reference character 1100. A packet sending method/device 1100 may include an idle state 1102.

Output data can be received 1104. Output data may include request data, which can include a command for execution by a CAM device, or the like, or can include response data having a result generated from a particular command.

A count value of a packet may be determined 1106. Such a step may include determining how much additional data may follow an initial packet header. Of course, a resulting size value may reflect a grouping of characters. That is, a size value may reflect "double-words", words, or bytes, for example.

A combination control character may then be generated for such outgoing data. As but one example, a method/device 1100 can provide one of many possible combination control characters for a single packet size. Preferably, such multiple code values may be provided for more common packet sizes, while single code values may be provided for other packet sizes.

The particular example of FIG. 11 illustrates an encoding scheme like that for FIG. 6. If reference is made back to FIG. 6, multiple code values may be provided for size values of 0 and 1, while single code values may be provided size values of 2-9. Thus, in FIG. 11, if a size value is less than 2 (SIZE<2), a packet type may be determined 1108, and then a combination control character may be generated from a size and type value 1110.

In contrast, if a size value is greater than 1 (SIZE>1), a combination control character may be generated from a size value 1112.

Once a combination control character has been generated by a state 1110 or 1112, data may be output with such a control character 1114. In this way, a start of a transmitted packet may be indicated by one of a number of possible combination control characters. A state 1114 may include outputting a control character on one set of signal lines (e.g., byte lanes), while outputting data characters on different parallel sets of signal lines (e.g., other byte lanes).

It is understood that a state 1114 can include outputting data values in the same size groupings used to determine a size of a packet. That is, if a count value from a state 1106 is in double-words, a state 1116 may output data in double words (a portion of which is a combination control character).

Following an output of data for a state 1116, if a count value is zero (COUNT=0), a packet can be considered as completely sent. However, if a count value is not zero (COUNT !=0), a count value can be decremented 1118, and a new set of data can be sent 1120. Once again, if a count value is zero (COUNT=0), a packet can be considered as completely sent. However, if a count value is not zero (COUNT !=0), a state diagram can return to state 1118 and 1120.

In this way, a packet sending method and device may generate a single combination control character that indicates a start of a packet in addition to a size of a packet. Still further, different combination control characters can represent same packet sizes.

Figure 12:
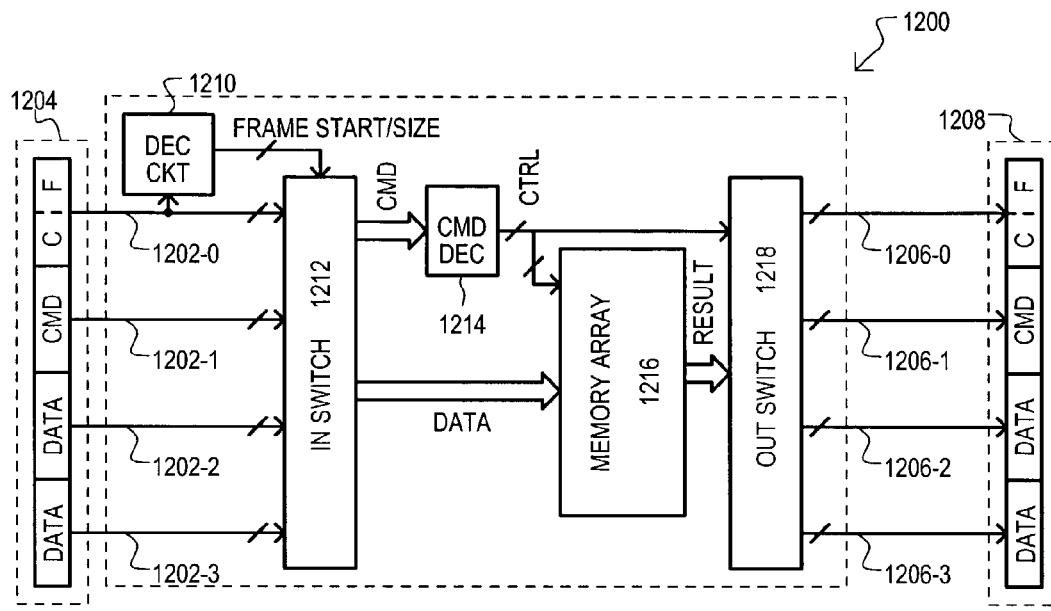
FIG. 12 is a block diagram of a memory device according to an embodiment of the present invention.

Referring now to FIG. 12, an example of a memory device according to one embodiment is set forth and designated by the general reference number 1200. A memory device 1200 may include a number of data input lines (1202-0 to 1202-3) that may receive an input data packet 1204. A memory device 1200 may include data output lines (1206-0 to 1206-3) upon which a memory device 1200 may provide an output packet 1208.

A CAM device 1200 may also include a decoder circuit 1210, an input switch 1212, a command decoder 1214, a memory array 1216, and an output switch 1218. A decoder circuit 1210 may determine a start indication and/or size value from one character of an incoming packet. As but one example, a decoder circuit 1210 may have an arrangement such as that shown in FIG. 8.

An input switch 1212 may selectively apply received packet data to a command decoder 1214 and/or a memory array 1216. As but one example, a received packet may have command data at a predetermined location in a first portion of a packet. Upon detecting a packet start, an input switch 1212 can provide such command data to a command decoder. A command decoder 1214 can activate predetermined control signals CTRL according to a particular command type. In addition, data for executing a command indicated by command data may be provided from an input switch 1212 to a memory array.

In response to control signals CTRL and data DATA, a memory array 1216 may generate output results. Such output results may be selectively applied to packet sections by an output switch 1218 controlled by control signals CTRL.

Figure 13A:
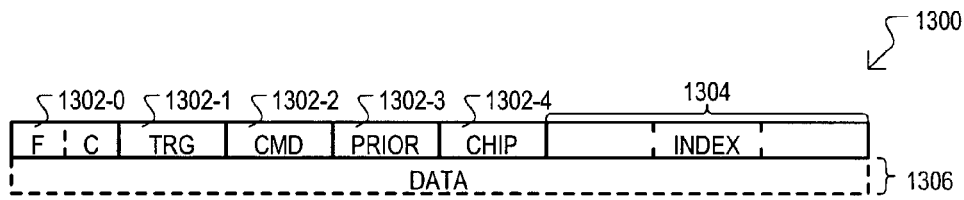
FIGS. 13A and 13B are a block diagrams showing examples of a data packet formats for a content addressable memory (CAM) device according to an embodiment of the present invention.
Figure 13B:
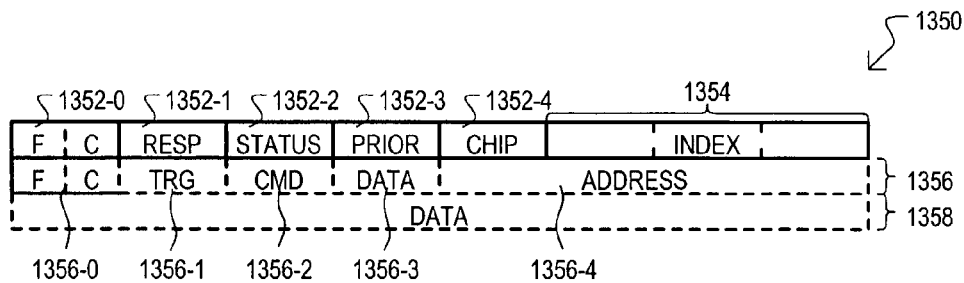
Figure 14:
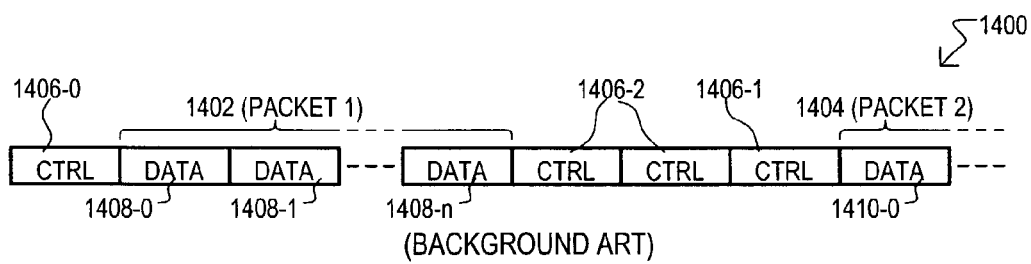
FIG. 14 is a block diagram showing a first example of conventional data packet framing.
Figure 15:
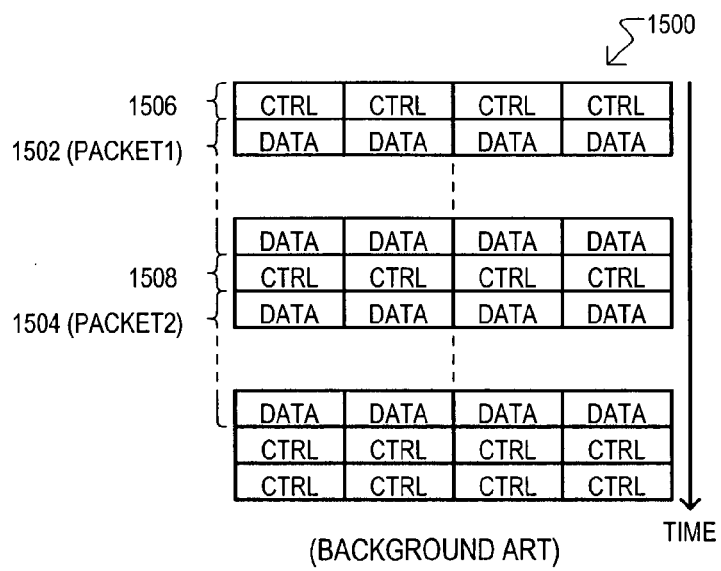
FIG. 15 is a block diagram showing a second example of conventional data packet framing.
Figure 16:
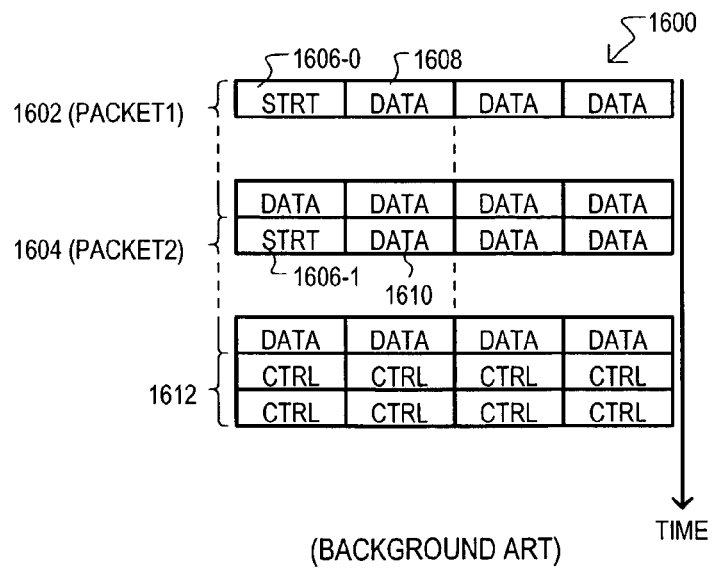
FIG. 16 is a block diagram showing a third example of conventional data packet framing.
Figure 17:
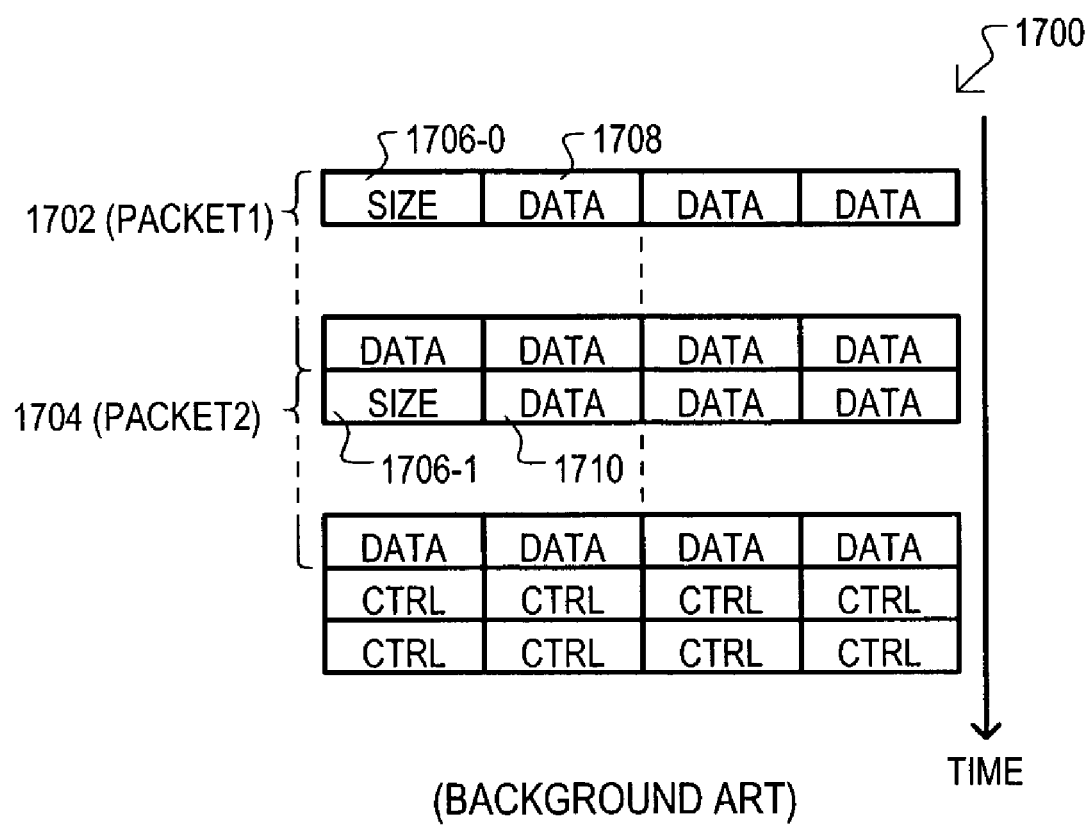
FIG. 17 is a block diagram showing a fourth example of conventional data packet framing.

Referring now to FIGS. 13A and 13B, examples of a data packet for a content addressable memory (CAM) device according to an embodiment is set forth in block diagrams.

FIG. 13A shows various examples of a "request" packet for a CAM device. Such examples are represented by the general reference character 1300, and may include a combination control character F|C 1302-0, a target value TRG 1302-1, a command value CMD 1302-2, a priority value PRIOR 1302-3, a device value CHIP 1302-4, and an index value INDEX 1304.

A combination control character F|C 1302-0 can have the same structure as various examples described above.

A target value TRG 1302-1 may identify a target for a request and can represent a particular portion of a CAM device for which a command is intended.

A command value 1302-2 may indicate a command to be performed by a CAM device. Such commands may include, without limitation, searches, reads, writes, parity checks, and "learns." A search command can typically include applying a comparand value (also referred to as a key) to a number of data values stored in entries, or the like. According to such a comparison, a CAM device can generate a search response. Results of a search command may include a match when a key matches one entry, a multiple match, when a key matches multiple entries, and a miss, when a key doesn't match any entry. Typically, match results may be generated when each bit of a key matches all bits of an entry, or when bits of a key match corresponding non-masked portions of an entry. Read and write commands may read data from, and write data to particular entries within a CAM device. A parity check can check the parity of predetermined values within a CAM device. A learn command may write a key value to an available entry in the event an initial search operation yields a miss response.

A priority value PRIOR 1302-3 can indicate a priority of a given request. Such a value can be compared with priority values associated with matching entries to establish a priority among results.

A device value CHIP 1302-4 can indicate a destination CAM device for a given request.

An index value INDEX 1304 can be an address of a register within a CAM device that stores values associated with a request.

In some forms, a request packet 1300 may further include data 1306. Data 1306 may be data accompanying a request. As but a few of the many possible examples, if a command value CMD 1302-2 is a search command, data 1306 may include a key value. If a command value CMD 1302-2 is a read command, data 1306 may include a CAM address value. If a command value CMD 1302-2 is a write command, data 1306 may include a CAM address as well as write data.

FIG. 13B shows various examples of a "response" packet for a CAM device. Such examples are represented by the general reference character 1350, and may include a combination control character F|C 1352-0, a response value RESP 1352-1, a status value STATUS 1352-2, a priority value PRIOR 1352-3, a device value CHIP 1352-4, and an index value INDEX 1354.

A combination control character F|C 1352-0 can have the same structure as various examples described above.

A response value RESP 1352-1 may identify a packet 1350 as a response packet, and distinguish it from a request packet.

A status value 1352-2 can indicate a status of a response. For example, a status value 1352-2 can indicate a precedence of a response with respect to other responses. Thus, if multiple devices generate response packets to a same request, a response packet having a highest precedence status can be filtered and/or otherwise selected from among such multiple responses. In addition or alternatively, a status value 1352-2 can indicate if a response packet includes complete data (e.g., included data represents a successful execution of a command).

A priority value PRIOR 1352-3 of a response packet can indicate a priority of a given response. Such a value can be compared with priority values associated with other responses to establish a priority among responses.

A device value CHIP 1352-4 can indicate a CAM device originating a given response packet.

An index value INDEX 1354 can be an index value generated by a match result from a search operation within a CAM device.

In some arrangements, a response packet 1350 may further include command attached data 1356. Command attached data may represent a further request generated in response to a request. In FIG. 13B, command attached data 1356 may be command data for another memory device. Accordingly, command attached data 1356 may include a combination control character F|C 1356-0, a target value TRG 1356-1, a command value CMD 1356-2, a data value DATA 1356-3, and an address value ADDRESS 1356-4. A combination control character C|D 1356-0 may have a structure like the various examples noted above. A target value TRG 1356-1 may identify a target for a request and can represent a particular portion of a memory device for which a command is intended. A command value CMD 1356-2 may indicate a command to be performed by a targeted memory device. Such commands may include, reads and/or writes. A data value DATA 1356-3 may include data for use with a command indicated by command value 1356-2. An address value ADDRESS 1356-4 can indicate an address that can be accessed to execute a command indicated by a command value 1356-2.

In some arrangements, a response packet 1350 may further include command attached data 1358. Data 1358, like data 1306 of a request 1300, may be data accompanying a response.

In this way, request and response packets may be provided for various operations of a CAM device, where such packets include combination control characters. Such an arrangement can allow for more compact data packets than conventional approaches that may dedicate an entire character to indicate a packet start and/or packet size.

While the embodiments set forth herein have been described in detail, it should be understood that the present invention could be subject to various changes, substitutions, and alterations without departing from the spirit and scope of the invention. Accordingly, the present invention is intended to be limited only as defined by the appended claims.

What is claimed is:

1. A method of framing data packets, comprising the step (s) of:
    starting a packet with a combination control code of N bits that provides first packet format information that indicates a start of the packet and second packet format information, the second packet information being a size value that indicates a size of the packet; and
    the packet including at least one data character of N bits, where N is no more than 10.

2. The method of claim 1, wherein:
    the packet is a request packet that includes a request for the execution of a predetermined operation; and
    the at least one data character includes a request priority value that can restrict the operation to portions of a semiconductor device according to internal priority values for such portions.

3. The method of claim 1, further including:
    providing a plurality of size values for a same size packet.

4. The method of claim 1, further including:
    distinguishing request packets, that include commands for execution by a memory device, from response packets that include result data from executed commands, by including a predetermined type data character in the packet having the same number orbits as the combination control code.

5. The method of claim 1, wherein:
    the packet is a response packet that includes a result of a predetermined operation; and
    the at least one data character includes a response priority value that establishes a priority for the result with respect to results of other response packets.

6. A method, comprising the steps of:
    framing packets in a content addressable memory system, the packets being part of an encoded communication, wherein the framing includes:
    selecting one group of control codes;
    applying a control code from the selected one group to a start of the packets; and
    selecting from multiple control codes for a same payload size.

7. The method of claim 6, further including:
    selecting a control code according to a payload size.

8. The method of claim 6, further including:
    framing packets according to a predetermined character alignment.

9. The method of claim 8, wherein:
    the predetermined character alignment is a $2^i$ character alignment, wherein i is more than 1.

10. The method of claim 6, further including:
    applying the selected control code as a first character of a packet that includes a plurality of characters.

11. The method of claim 6, wherein:
    the control codes are transmitted as encoded control codes with a strobe signal, the encoded control codes having a first sequence of bit values when the strobe signal has one value and the encoded control codes having a different sequence of bit values when the strobe signal has another value.

12. A memory device, comprising:
    a plurality of signal inputs, at least a first set of the signal inputs for receiving at least one combination control character that includes framing information for indicating a start of a data packet and feature information that indicate a feature of the data packet, the combination control character having no more bits than other data characters of the data packet, the packet being a request packet that includes a request for the execution of a predetermined operation, at least one data character of the data packet including a request priority value that can restrict the operation to portions of the memory device according to internal priority values for such portions; and a comparator that generates a start indication and a feature value in response to the at least one combination control character.

13. The memory device of claim 12, wherein:
the feature value is a size value for the packet.

14. The memory device of claim 12, further including:

a command decoder coupled to receive command data from the packet; and a memory array that performs predetermined functions in response to command data.

15. The memory device of claim 14, wherein;

the memory array comprises a content addressable memory array.

* * * * *